US010901819B1

(12) United States Patent
Dayan (10) Patent No.: US 10,901,819 B1
(45) Date of Patent: Jan. 26, 2021

(54) DISTRIBUTED QUEUEING OVER A REDIS CLUSTER

(71) Applicant: PayPal, Inc., San Jose, CA (US)

(72) Inventor: Assaf Amir Dayan, Giv'atayim (IL)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 16/537,602

(22) Filed: Aug. 11, 2019

(51) Int. Cl.
*G06F 9/54* (2006.01)
*G06F 16/22* (2019.01)
*G06F 11/10* (2006.01)

(52) U.S. Cl.
CPC .............. *G06F 9/546* (2013.01); *G06F 9/542* (2013.01); *G06F 11/1004* (2013.01); *G06F 16/2255* (2019.01); *G06F 2209/544* (2013.01)

(58) Field of Classification Search
CPC ....................................................... G06F 9/546
USPC .................................................. 719/313, 314
See application file for complete search history.

(56) References Cited

U.S. PATENT DOCUMENTS

| 7,509,653 | B2* | 3/2009 | Das | G06F 9/546 |
| | | | | 707/999.01 |
| 9,639,403 | B2* | 5/2017 | Peters | G06F 9/5027 |
| 10,413,238 | B1* | 9/2019 | Cooper | A61B 5/1118 |
| 10,608,937 | B1* | 3/2020 | Volpe | H04L 45/50 |
| 2012/0287946 | A1* | 11/2012 | Matthews | H04L 47/125 |
| | | | | 370/474 |

* cited by examiner

*Primary Examiner* — Andy Ho
(74) *Attorney, Agent, or Firm* — Haynes and Boone, LLP (57) ABSTRACT

A system and method for distributed queuing of event messages is described. A queue of several event messages is received. One or more sub-queues is generated from the received queue. Each of the set of sub-queues is hashed. Each of the one or more sub-queues is then partitioned to a location on a storage cluster based on the hash values. For each of the set of sub-queues, the location on the storage cluster to which the sub-queue is partitioned is saved.

20 Claims, 6 Drawing Sheets

DISTRIBUTED QUEUEING OVER A REDIS CLUSTER

TECHNICAL FIELD

The subject technology generally relates to processing event messages related to user interaction with mobile applications, webpages and other online portals, and more particularly, relates to a system and method for queuing the events over a remote dictionary server (Redis) cluster for subsequent processing.

BACKGROUND

In order for companies to enhance security in transactions conducted by its customers in the online space, events such as user interaction with mobile applications, webpages and other online portals may be analyzed. For example, these events may be recorded and made available for inspection by risk applications. With regards to the inspections, time is of the essence, as only several hundred milliseconds are allotted to the system for arriving at a disposition. Any longer than a several hundred milliseconds and the user may experience a noticeable delay.

Within this limited timeframe, various computations and data enrichments are performed on the request by a producer application (i.e., an application that produces the payload) to generate a payload. The payload is then dispatched to a consumer application (i.e., an application that consumes the payload), which in turns transmits the payload to a risk application. Once the payload reaches risk application, the payload will hop through several components before becoming available for adjudication (e.g., component and model calculations).

While there are several messaging services that exist that process event streams, these services favor guaranteed delivery over speed and expediency. For example, Kafka, which is an open-source stream-processing software platform, is able to handle real-time data feeds with high throughput and low latency; however, because Kafka operates in a persistent manner (i.e., saves events to disk), latency may become an issue as a result of input/output operations. As such, there needs to be a mechanism for coordinating the production and consumption of event messages so that large payloads may be processed in a low latency manner. This latency must be within an acceptable limit for real-time risk determinations.

SUMMARY

According to various aspects of the subject technology, a system for distributed queuing over a Redis cluster is described. A queue of several event messages is received. One or more sub-queues is generated from the received queue. Each of the set of sub-queues is hashed. Each of the one or more sub-queues is then partitioned to a location on a storage cluster based on the hash values. For each of the set of sub-queues, the location on the storage cluster to which the sub-queue is partitioned is saved.

According to various aspects of the subject technology, a method for distributed queuing over a Redis cluster is described. A queue of several event messages is received. One or more sub-queues is generated from the received queue. Each of the set of sub-queues is hashed. Each of the one or more sub-queues is then partitioned to a location on a storage cluster based on the hash values. For each of the set of sub-queues, the location on the storage cluster to which the sub-queue is partitioned is saved.

According to various aspects of the subject technology, a non-transitory machine-readable medium having stored thereon machine-readable instructions executable for distributed queuing over a Redis cluster is described. A queue of several event messages is received. One or more sub-queues is generated from the received queue. Each of the set of sub-queues is hashed. Each of the one or more sub-queues is then partitioned to a location on a storage cluster based on the hash values. For each of the set of sub-queues, the location on the storage cluster to which the sub-queue is partitioned is saved.

Additional features and advantages of the subject technology will be set forth in the description below, and in part will be apparent from the description, or may be learned by practice of the subject technology. The advantages of the subject technology will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the subject technology and are incorporated in and constitute a part of this specification, illustrate aspects of the subject technology and together with the description serve to explain the principles of the subject technology.

DETAILED DESCRIPTION

In order to efficiently and effectively manage user requests received via websites, mobile applications, etc., companies utilize suites of applications/event processors for intercepting connection data (e.g., HyperText Transfer Protocol data) to procure information from low- and high-level components of the connection. A producer application, for example, may generate a payload that is then dispatched to a consumer application for consumption. The payload may include parameters of the connection such as, but not limited to, a profile of what kind of user is making the request, whether the user is utilizing a proxy, whether a virtual private network (VPN) is involved, and a fingerprint of the browser and/or operating system (OS) used. They payload may also be media data such as pictures or videos from webcams. The payload is ultimately delivered to a risk application where adjudication of the connection is performed. That is, the risk application determines whether or not the connection may be established/allowed to persist.

In order to best serve a customer base, the adjudication process must be completed in a very short amount of times (typically in 700 milliseconds or less); otherwise, the latency becomes noticeable to customers. In order to ensure minimal latency, a process for distributed queuing across a Redis cluster is proposed. By using non-persistent memory such as random access memory (RAM), Redis introduces little to no latency, even when communicating large messages. While a single instance of Redis provides the above-mentioned benefits of low latency, a Redis cluster coupled with a properly managed distributed queuing process can provide scalability to further leverage these characteristics. This configuration enables the system to couple the distributed, scalable deployment and parallelism of a platform like Apache Kafka with the added performance of Redis.

This specification includes references to "one embodiment," "some embodiments," or "an embodiment." The appearances of these phrases do not necessarily refer to the same embodiment. Particular features, structures, or characteristics may be combined in any suitable manner consistent with this disclosure.

"First," "Second," etc. As used herein, these terms are used as labels for nouns that they precede, and do not necessarily imply any type of ordering (e.g., spatial, temporal, logical, cardinal, etc.). Furthermore, various components may be described or claimed as "configured to" perform a task or tasks. In such contexts, "configured to" is used to connote structure by indicating that the components include structure (e.g., stored logic) that performs the task or tasks during operation. As such, the component can be said to be configured to perform the task even when the component is not currently operational (e.g., is not on). Reciting that a component is "configured to" perform one or more tasks is expressly intended not to invoke 35 U.S.C. § 112(f) for that component.

Figure 1:
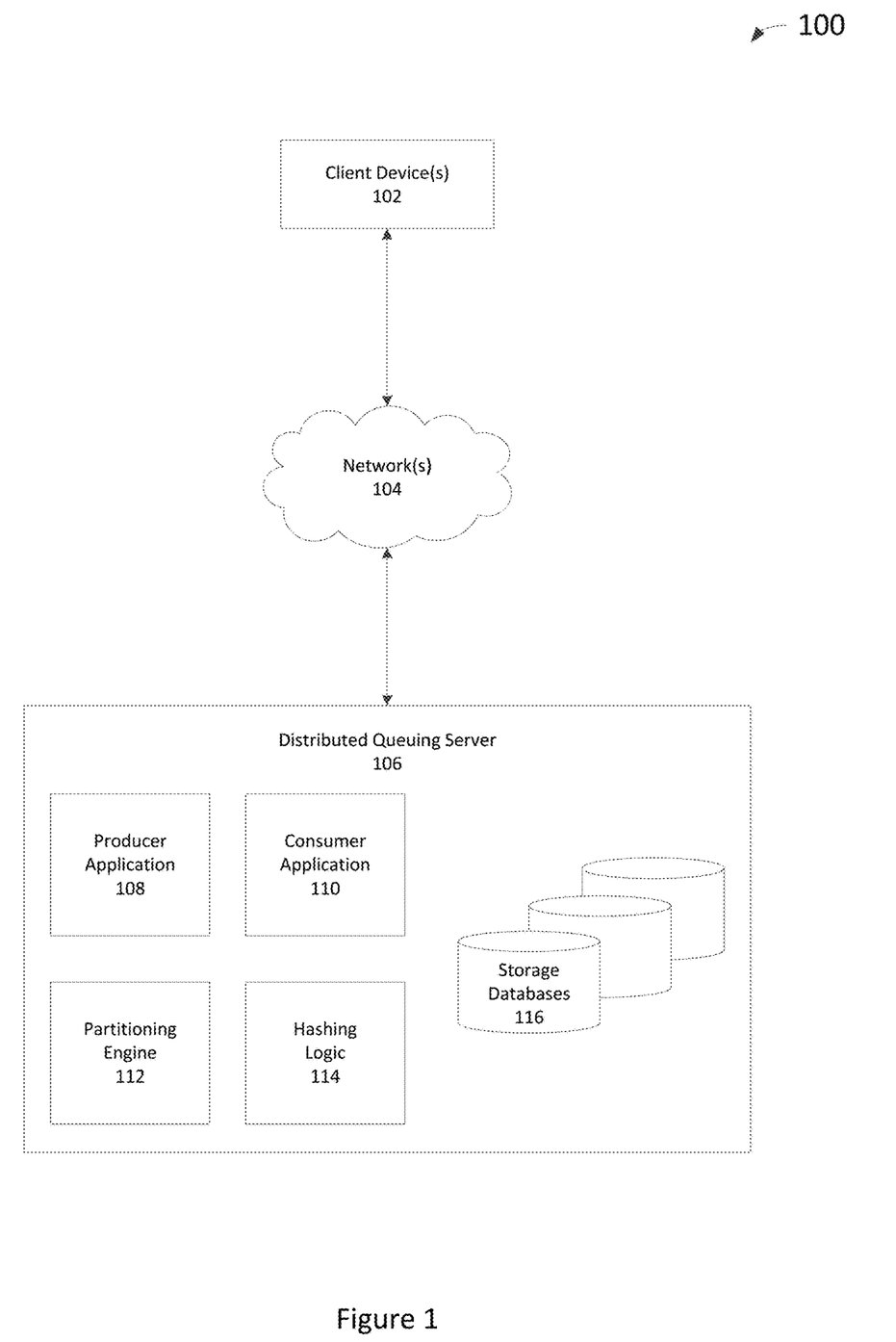
FIG. 1 is a block diagram of an exemplary computing system on which the distributed queuing of event messages over a Redis cluster may be performed.

FIG. 1 is a block diagram of an exemplary computing environment in which an application for distributed queuing over a Redis cluster may operate. As shown, computing environment 100 may comprise or implement a plurality of applications, servers, devices, storage, and/or software components that operate to perform various methodologies in accordance with the described embodiments. Exemplary servers, devices, and/or software components may include, for example, stand-alone and enterprise-class servers running an operating system (OS) such as a MICROSOFT® OS, a UNIX® OS, a LINUX® OS, or other suitable OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers and/or applications running on respective servers. One or more servers may be operated and/or maintained by the same or different entities.

Computing environment 100 may include, among various devices, servers, databases and other elements, one or more client devices 102, such as a laptop, a mobile computing device, a tablet, a personal computer, a wearable device, and/or any other computing device having computing and/or communications capabilities in accordance with the described embodiments. Client devices 102 may also include a cellular telephone, smart phone, electronic wearable device (e.g., smart watch, virtual reality headset), or other similar mobile devices that a user may carry on or about his or her person and access readily.

Client devices 102 may provide one or more client programs, such as system programs and application programs to perform various computing and/or communications operations. Exemplary system programs may include, without limitation, an operating system (e.g., MICROSOFT® OS, UNIX® OS, LINUX® OS, Symbian OS™, iOS, Android, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Exemplary application programs may include, without limitation, a payment system application, a web browser application, messaging application, contacts application, calendar application, electronic document application, database application, media application (e.g., music, video, television), location-based services (LBS) application (e.g., GPS, mapping, directions, positioning systems, geolocation, point-of-interest, locator) that may utilize hardware components such as an antenna, and so forth. One or more of client programs may display various graphical user interfaces (GUIs) to present information to and/or receive information from one or more servers that host the respective websites. In some embodiments, client programs may include one or more applications configured to conduct functionalities including but not limited to financial services, social media, online commerce, etc.

As shown, client devices 102 may be communicatively coupled via one or more networks 104 to a variety of applications and storage. For example, distributed queuing server 106, which includes storage databases 116, is connected to client devices 102 via network 104. Distributed queuing server 106 may be structured, arranged, and/or configured to establish one or more communications sessions between distributed queuing server 106 and the various client applications and/or client programs. Furthermore, communication sessions between distributed queuing server 106, producer application 108, consumer application 110, storage databases 116, as well as the client devices 102, may involve unidirectional and/or bidirectional exchanges of information, may occur over one or more types of networks 104 depending on the mode of communication, and may be performed in a synchronous or asynchronous manner. While the embodiment of FIG. 1 illustrates a computing environment 100 deployed in a client-server/application operating environment, it is to be understood that other suitable operating environments and/or architectures may be used in accordance with the described embodiments.

Data communications between client devices 102 and distributed queuing server 106 may be sent and received over one or more networks 104 such as the Internet, a WAN, a WWAN, a WLAN, a mobile telephone network, a landline telephone network, personal area network, as well as other suitable networks. For example, client devices 102 may communicate with distributed queuing server 106 over the Internet or other suitable WAN by sending and or receiving information via interaction with a website, e-mail, IM session, and/or video messaging session. Any of a wide variety of suitable communication types between client devices 102 and the remainder of the applications, servers and databases in network environment 100 may take place, as will be readily appreciated. In particular, wireless communications of any suitable form (e.g., Bluetooth, near-field communication, etc.) may take place between all the components, such as that which often occurs in the case of mobile phones or other personal and/or mobile devices.

Distributed queuing server 106 may comprise one or more producer applications 108 that intercepts event messages. Partitioning engine 112 may then partition the list of event messages that are intercepted by producer application 108. Distributed queuing server 106 may also include a hashing logic engine 114. As will be described in more details below, hashing logic engine 114 may hash the event messages to produce a hash value. The hash value is then used by producer application 108 to partition the event messages across the storage databases 116 in a judicious manner (e.g., distributing them evenly so as to create an even load across the databases). Lastly, the consumer application 110 may consume the event messages.

In various embodiments, client devices 102 may communicate with websites 104 via one or more of a web interface provided by web server, a programmatic interface provided by API server, and/or a messaging interface provided by messaging server. It may be appreciated that web server, API server, and messaging server may be structured, arranged, and/or configured to communicate with various types of client devices 102, and/or client programs, and may interoperate with each other in some implementations.

The web server may be arranged to communicate with web clients and/or applications such as a web browser, web browser toolbar, desktop widget, mobile widget, web-based application, web-based interpreter, virtual machine, mobile applications, and so forth. The API server may be arranged to communicate with various client programs comprising an implementation of API. The Messaging server may be arranged to communicate with various messaging clients and/or applications such as e-mail, IM, SMS, MMS, telephone, VoIP, video messaging, IRC, and so forth, and the messaging server may provide a messaging interface to enable access by client devices 102 to the various services and functions provided.

Distributed queuing server 106 may include one or more storage databases 116 for storing the event messages. Storage databases 116 generally may store and maintain various types of information for use by application servers and may comprise or be implemented by various types of computer storage devices (e.g., servers, memory such as random access memory) and/or database structures (e.g., relational, object-oriented, hierarchical, dimensional, network) in accordance with the described embodiments.

Figure 2:
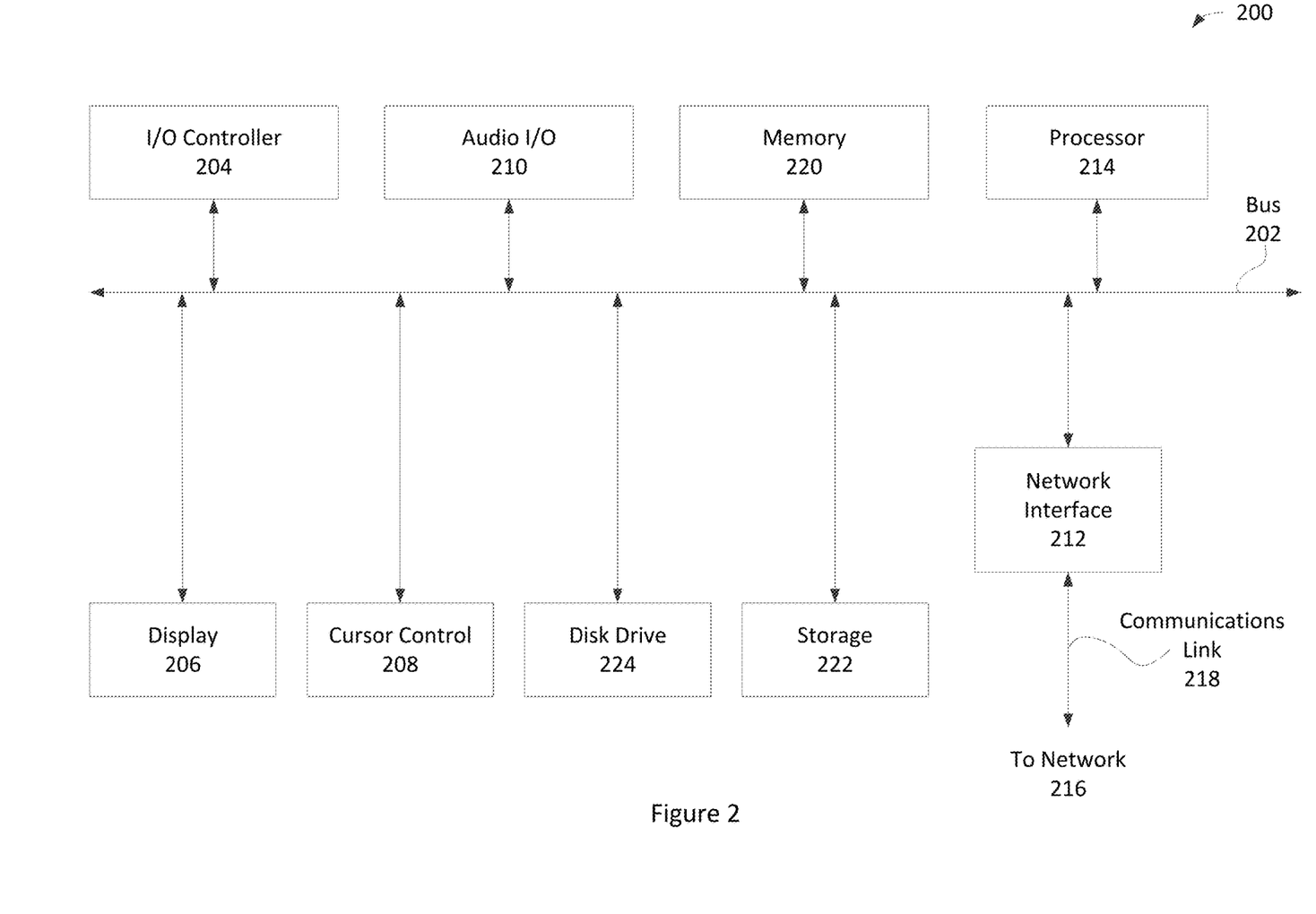
FIG. 2 is a block diagram of an exemplary computer system suitable for implementing one or more devices of the computing system in FIG. 1.

FIG. 2 illustrates an exemplary computer system 200 in block diagram format suitable for implementing on one or more devices of the computing environment in FIG. 1. In various implementations, a device that includes computer system 200 may comprise a personal computing device (e.g., a smart or mobile phone, a computing tablet, a personal computer, laptop, wearable device, PDA, etc.) that is capable of communicating with a network. A service provider and/or a content provider may utilize a network computing device (e.g., a network server) capable of communicating with the network. It should be appreciated that each of the devices utilized by users, service providers, and content providers may be implemented as computer system 200 in a manner as follows. Additionally, as more and more devices become communication capable, such as smart devices using wireless communication to report, track, message, relay information and so forth, these devices may be part of computer system 200.

Computer system 200 may include a bus 202 or other communication mechanisms for communicating information data, signals, and information between various components of computer system 200. Components include an input/output (I/O) controller 204 that processes a user action, such as selecting keys from a keypad/keyboard, selecting one or more buttons, links, actuatable elements, etc., and sends a corresponding signal to bus 202. I/O controller 204 may also include an output component, such as a display 206 and a cursor control 208 (such as a keyboard, keypad, mouse, touchscreen, etc.). In some examples, I/O controller 204 may include an image sensor for capturing images and/or video, such as a complementary metal-oxide semiconductor (CMOS) image sensor, and/or the like. An audio I/O component 210 may also be included to allow a user to use voice for inputting information by converting audio signals. Audio I/O component 210 may allow the user to hear audio.

A transceiver or network interface 212 transmits and receives signals between computer system 200 and other devices, such as another user device, a merchant server, an email server, application service provider, web server, a payment provider server, and/or other servers via a network. In various embodiments, such as for many cellular telephone and other mobile device embodiments, this transmission may be wireless, although other transmission mediums and methods may also be suitable. A processor 214, which may be a micro-controller, digital signal processor (DSP), or other processing component, processes these various signals, such as for display on computer system 200 or transmission to other devices over a network 216 via a communication link 218. Again, communication link 218 may be a wireless communication in some embodiments. Processor 214 may also control transmission of information, such as cookies, IP addresses, images, and/or the like to other devices.

Components of computer system 200 also include a system memory 220 (e.g., RAM), a static storage component 222 (e.g., ROM), and/or a disk drive 224. Computer system 200 performs specific operations by processor 214 and other components by executing one or more sequences of instructions contained in system memory 220. Logic may be encoded in a computer-readable medium, which may refer to any medium that participates in providing instructions to processor 214 for execution. Such a medium may take many forms, including but not limited to, non-volatile media, volatile media, and/or transmission media. In various implementations, non-volatile media includes optical or magnetic disks, volatile media includes dynamic memory such as system memory 220, and transmission media includes coaxial cables, copper wire, and fiber optics, including wires that comprise bus 202. In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the techniques and algorithms described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer-readable media. It is also contemplated that software identified herein may be implemented using one or more computers and/or computer systems, networked and/or otherwise. Such software may be stored and/or used at one or more locations along or throughout the system, at client 102, distributed queuing server 106, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Kafka has been widely used as a messaging service due to its reliability (i.e., guarantees delivery) and overall speed. However, Kafka is subject to potential end-to-end latency issues when large messages (e.g., over 1 KB), which are often produced by producer applications, are involved. Additionally, Kafka operates in a persistent manner which introduces disk input/output operations (e.g., reading or writing to a disk), and which may cause additional latency. With potentially several hundred million events being generated daily, Kafka is susceptible to latency issues.

Unlike Kafka, which operates in persistent manner (i.e., Kafka saves event messages onto a disk), Redis utilizes RAM and operates similar to cache. Redis is a NoSQL, in-memory database, which makes it a prime candidate for a fast messaging backbone. Firstly, Redis is extremely fast by virtue of it not being persistent (i.e., stores in memory), and thus, does not introduce latency with large messages. Furthermore, Redis has well-maintained native libraries for many languages and thus is easy to integrate.

Redis's design favors speed over reliability and persistency, which squarely fits within a messaging pipeline's requirements, and which makes Redis particularly adept for near-real-time, single-use messages. For example, if 1000 messages have been saved by Kafka, and Kafka crashes, upon restart all 1000 messages will still be queued up for processing. As such, the $1001^{st}$ message will need to wait for the first 1000 to be processed before it's considered.

If Redis, on the other hand, were to crash with 1000 unprocessed messages, none of the messages would be retained. Redis, which operates like cache, will start fresh. In other words, the original 1000 messages will no longer exist, and the $1001^{st}$ message will be processed as if it were the first message. Given that time is of the essence, the manner in which Redis handles a crash is preferable because the adjudication, as described above, must be performed in near real time. As such, there is no benefit in attempting to "catch up" with processing older messages because the time that's allotted for adjudication would have elapsed already (i.e., the system will have moved on with adjudication based on what information was available at the time). Thus, it's better to disregard old messages and move on to processing fresh messages in real time once the system is back online.

Redis, however, is not without some shortcoming. One problem with Redis' in-memory store is that large amounts of data can't be stored for long periods of time. Since the primary in-memory is smaller than a disk, it needs to be cleared regularly by moving data from in-memory to disks and making room for new data. Thus, Redis can also be persistent by allowing the dataset to be dumped into a disk if necessary. Redis also follows the master-slave architecture.

Another shortcoming of Redis is absence of the concept of parallelism (like Kafka does), where multiple processes can consume data at the same time. A Redis instance is also not scalable, therefore it cannot grow and shrink relative to the rest of the deployment. Additionally, Redis may be limited in terms of raw network speed. In other words, Redis could cause a bottleneck for larger deployments. For example, large payloads that require rapid processing may overwhelm a single instance of Redis. Lastly, as described above, a crash in Redis could cause potential data loss and system outage.

In order to resolve many of the shortcomings of Redis, a cluster of Redis nodes may be implemented. A Redis cluster provides for queue scaling and high-availability. Using a cluster of Redis while managing it with intelligent queuing (to be described below) allows the system to benefit from distributed, scalable deployment and parallelism. The cluster also overcomes the single-instance shortcomings.

A Redis cluster divides data between several Redis nodes such that each node only shares a portion of the load. Redis is essentially a key-value store. More complex value data types, such as lists and hashes, are addressable by binary-safe string keys. Complex data types are still addressable by a single key, which is mapped to a single hash value. If, for example, a list is used and is assigned to the key queue, each client addressing the key queue will reach the same node. In other words, complex data type values are not partitioned among cluster nodes. Only keys are partitioned somewhat evenly.

A Redis cluster effectively distributes the load between individual cluster nodes by assigning each group of keys to a different node. To achieve this, the Redis cluster introduces the idea of hash slots, where each key is hashed via a hash function (e.g., cyclic redundancy check-16 (CRC-16) modulo 16384); therefore, keys between 0 and 16,383, inclusive, are assigned. Each node in the cluster is assigned hash slots, which are effectively a range of hashes per node. A key and its value are stored in the matching cluster node for a particular key's hash slot.

For scalability and availability, Redis clusters support both scaling-out and replication. The cluster's structure is two-dimensional. For the purpose of this discussion, the two dimensions will be referred to as cluster width and cluster depth. Cluster width is defined as the number of active nodes sharing the key space among them. Cluster depth, on the other hand, is the dimension that governs the number of replications each node possesses. These replications are used for quick failure recovery.

Figure 3:
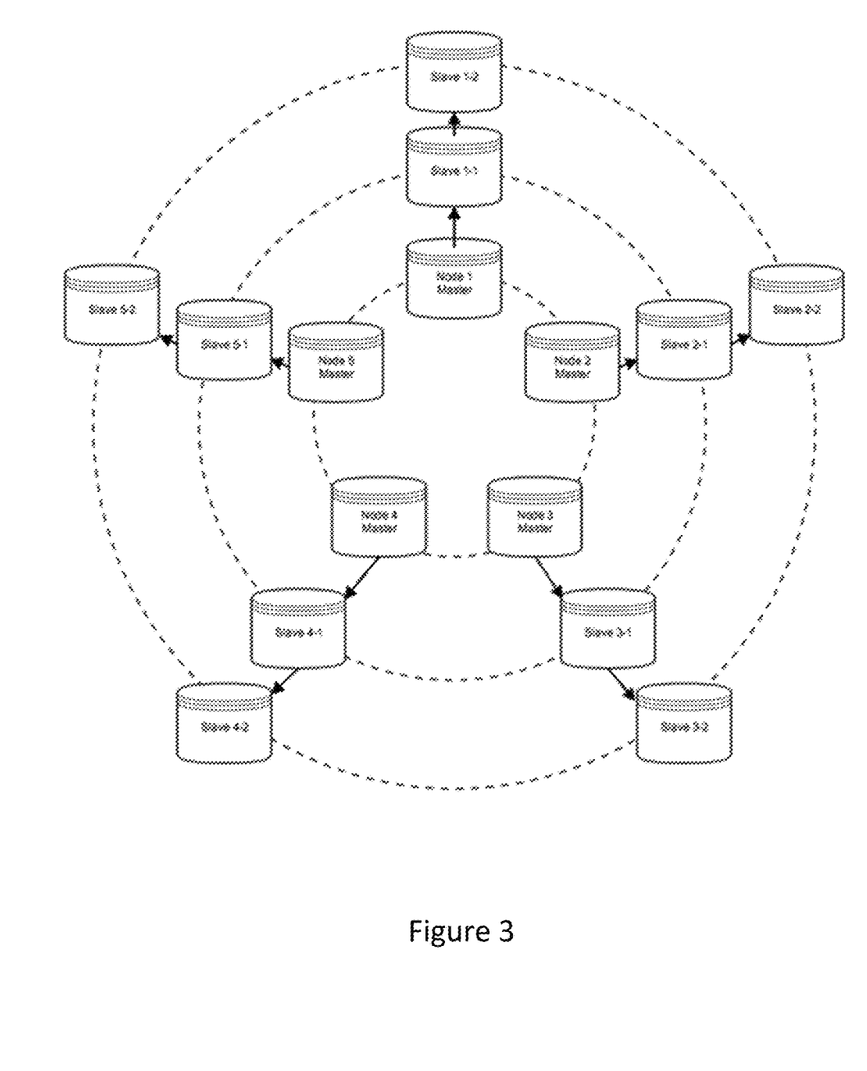
FIG. 3 provides a schematic representation of a Redis cluster.

FIG. 3 provides a schematic representation of a Redis cluster. In this example, a 5×3 (width×depth) Redis cluster is depicted. That is, there are five nodes that share the key space, and each of the five nodes has two replicas (the second replica is a replica of the first replica since the replication model has a propagating design). In this representation, the inner circle contains the master nodes. The master nodes are the active nodes which share the key space using hash slots. The hash slots may be shared as follows:

Node 1 contains hash slots 0 to 3276.
Node 2 contains hash slots 3277 to 6553.
Node 3 contains has slots 6554 to 9830.
Node 4 contains has slots 9831 to 13107.
Node 5 contains has slots 13108 to 16383.

Note that the cluster nodes will automatically divide the hash slots among them in such a way that all slots are covered. In this example, the hash slots are divided as evenly as possible.

The two outer circles include the slave nodes. Each outer layer is a replica of the layer immediately inside of it. For example, Slave 2-1 is a replica of Node 2 Master, while Slave 2-2 is a replica of Slave 2-1. Each master and each slave are a discrete Redis instance running as a single process.

In case a master node crashes, its replica will take over and fill in for it. The replicas are continuously updated with data from their immediate master. As such, the replicas remain substantially up-to-date with the latest data. In some cases, data written while a node fails may not be made available (i.e., streamed in time) to the replica. While this characteristic is sub-optimal, a system's design may take this into consideration so as to not be adversely affected by it. Furthermore, because the system's design stresses performance over guarantee delivery, such shortcomings are not catastrophic. In a worst-case scenario, a vertical column (i.e., a master and all its nodes) crashes. If this situation occurs, there is no way for the cluster to recover the data assigned with that hash slot range, and a cluster failure is experienced. However, as discussed above, when the vertical column is back online, it will again begin to be populated with messages. Since older messages will likely have gone stale by the time the cluster is rebooted, there'd be no benefit of having the previously-stored messages be made available. In other words, the processing of subsequent messages typically has no bearing on the processing of a previous message.

Redis cluster deployment, however, isn't without some technical concerns. First, Redis nodes are single threaded. This no-lock design enables very high performance; however, each Redis node cannot use more than one CPU core on the machine. Thus, several Redis nodes are required to fully utilize a multi-core machine. For example, in the 5×3 schematic representation of FIG. 3, there are 15 total Redis nodes—five masters in one ring, five replicas in a second ring, and another five replicas in a third ring. This configuration cannot be optimized by synchronizing across multiple CPUs. Instead, each instance of Redis may utilize a single CPU that is not shared with any other instances.

Additionally, since Redis is non-persistent, any messaging solution that uses Redis may contain only transient data. All methods of Redis persistency are disabled in order to maximize performance. Furthermore, Redis cluster's client design requires the client to be aware of the cluster's structure and hash slot distribution. In essence, the client knows which node should handle which key, so data is sent directly to its corresponding node instead of being sent to any node and then partitioned by the Redis nodes themselves. This direct client-node connectivity ensures minimal write latency but mandate a more sophisticated client implementation. Lastly, since each node behaves independently and is unaware of keys which aren't contained within its hash slot range, there is effectively a strict node separation. While this node separation is conducive to very high performance, it also requires careful data design (key dispersion) and command of usage. Accordingly, an application for distributed queuing of messages across the Redis cluster is required for managing production and consumption process.

To handle the coordination, a high-performance, linearly scalable, highly-available multi-producer/multi-consumer non-persistent messaging pipeline may be used. For purpose of this disclosure, the term Redis cluster producer/consumer (rcprodcons) will be utilized to refer to the messaging pipeline design. In order to couple the cluster's scalable, distributed nature with Redis' high performance, rcprodcons effectively acts a distributed queueing mechanism using a Redis cluster.

From the perspective of consumer or producer applications, the distributed queue generated by the rcprodcons appears as a single queue addressable by a common name, e.g., by the queue's virtual name. A producer will write to the virtual queue, and the consumer will read from the virtual queue. Behind the scenes, however, the virtual queue is partitioned across the cluster's nodes as multiple sub-queues. The granularity of the partitioning is configurable by each producer independently. In an exemplary embodiment, each producer will utilize identical configurations when partitioning the queue across the cluster's nodes. That being said, the system is able to tolerate some differences in configuration, even if there's little incentive to do so (e.g., utilizing different configurations may cause a system imbalance). Global metadata records, which are unique to each virtual queue, will be shared among producers and consumers so that automatic discovery, cleanup, and general maintenance may performed.

The producers and consumers are able to function completely independent from one another, and completely independent among themselves. In other words, they only need to point at the same Redis cluster, and address the same virtual queue name, and the remainder of the functions will occur automatically. In one embodiment, the partitioning is done automatically by each producer, and the sub-queue discovery and metadata (i.e., extra registry data) cleanup are done by each consumer independently.

To maximize performance, producers and consumers communicate in an asynchronous manner. The producer sends its payloads to a messaging service and the consumer consumes these messages and dispatches them to applications such as ones that assess risk. This messaging scheme enables decoupling, thus allowing each to operate independently from the other. The aforementioned messaging backbone has to be extremely fast, allow for very high throughput, support relatively large payloads (over 1 KB per message) with minimal performance degradation, be scalable, and for production-grade requirements, highly available.

Redis lists can effectively be used as queues by providing very fast appending and removal operations (i.e., O(1) run time complexity) either from the list's head or tail. A list, however, is associated with a single key (even though the list itself may contain many members), which acts as its name. While this works well with single, non-cluster Redis nodes, a more sophisticated solution is required to scale it across a cluster.

Figure 4:
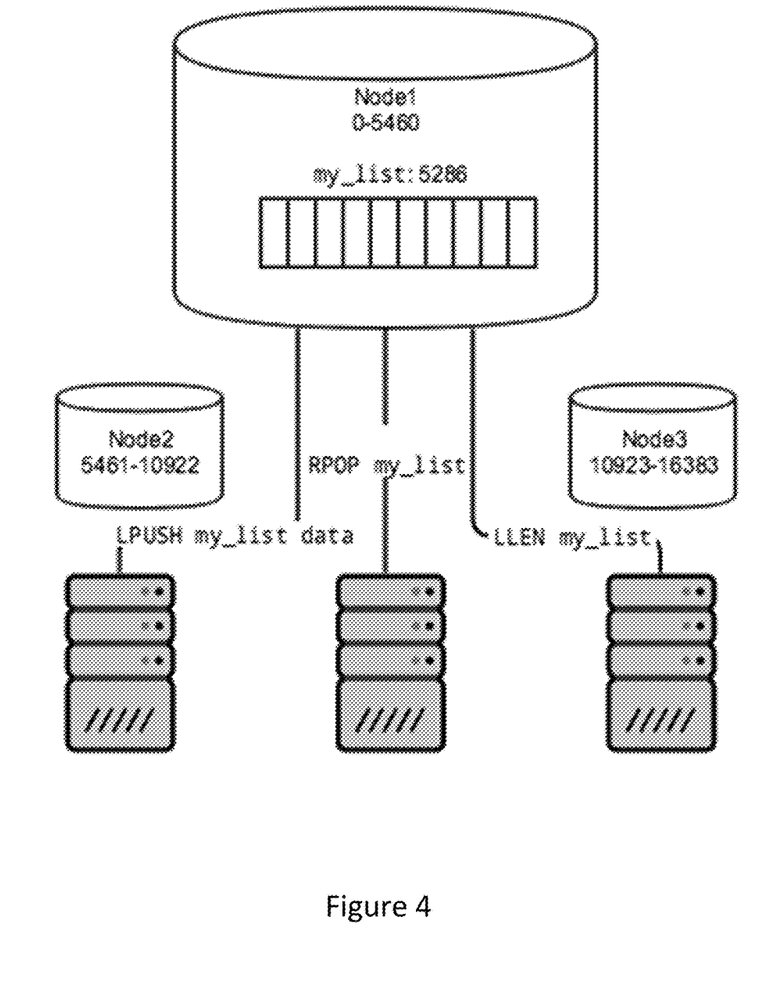
FIG. 4 provides a schematic diagram of a list propagated onto a Redis node.

FIG. 4 provides a schematic diagram of a list that's propagated onto a Redis node. Specifically, the diagram shows how a list called "my_list," which is assigned hash slot 5286 on a cluster, may be accessed. The list is associated with a single key, and hence is assigned to a single node. All of the commands and data reach the same node, thus no scalability gains are present in this configuration. In other words, Node1 handles the entire list as shown in FIG. 4 while Node2 and Node3 remains uninvolved. To better utilize the potential of a Redis cluster, a queue (list) may be partitioned among a Redis cluster. This is accomplished by rcprodcons implementing a mechanism for judiciously partitioning the queue.

Figure 5:
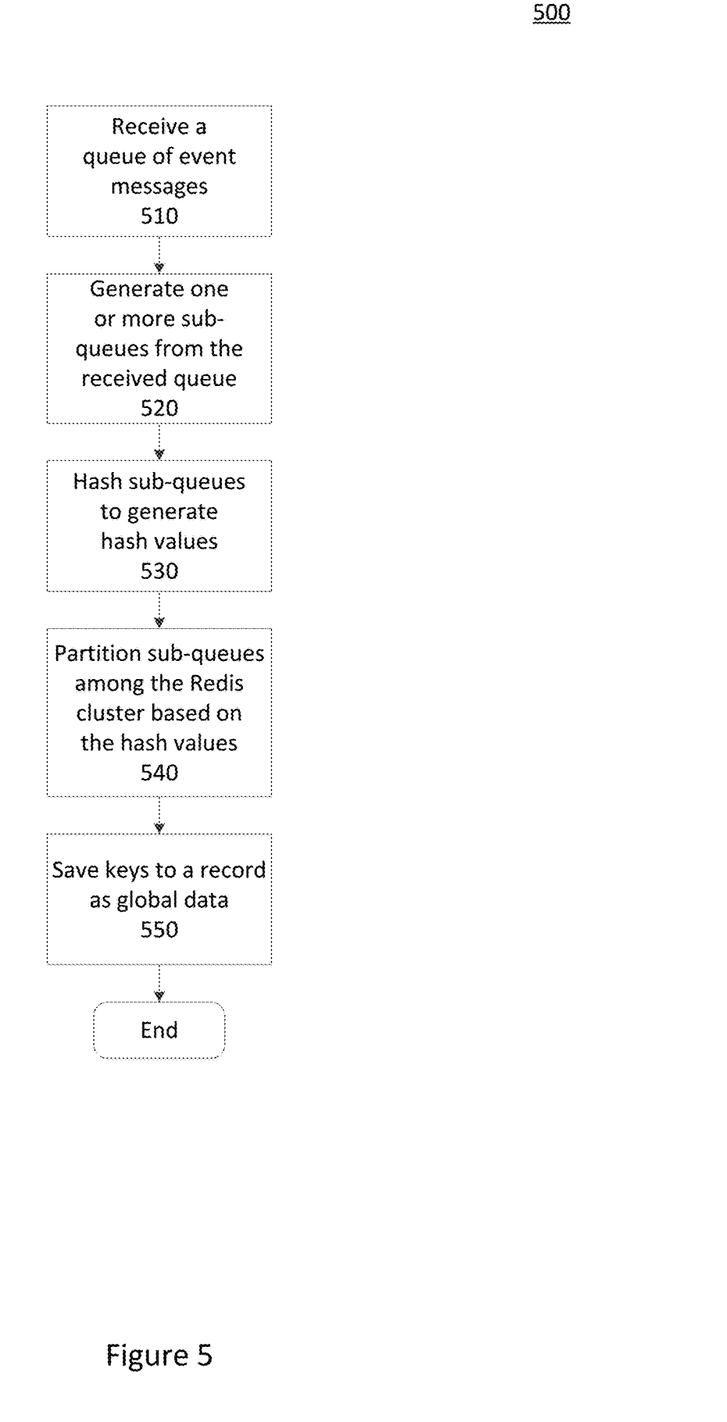
FIG. 5 illustrates an exemplary process 500 for distributed queuing of event messages over a Redis cluster.

FIG. 5 illustrates an exemplary process 500 for distributed queuing of event messages over a Redis cluster. In step 510, Rcprodcons receives a queue of several event messages. As described above, the event messages may include information corresponding to a user logging in and browsing a merchant webpage. The event messages contain information that may assist in the adjudication of permission for the user to proceed with certain activity while browsing the webpage.

In step 520, one or more sub-queues are generated from the queue. In order to determine which Redis node the sub-queues are to be partitioned to, the producers hash a sub-queue in step 530. As discussed above in reference to FIG. 3, Redis clusters utilize hash slots, where each key is hashed via a hash function (e.g., (CRC-16) modulo 16384). Therefore, keys between 0 and 16,383, inclusive, are assigned across the cluster. Each Redis node in the cluster is assigned hash slots, which are effectively a range of hashes per node. Keys and their values are stored in matching cluster nodes for a particular key's hash slot. No key is assigned to more than a single node. Each sub-queue may similarly be associated with a single key via the hashing function, and thus assigned to a single node. Once hashed, rcprodcons causes the producers to partition each of the one or more sub-queues to a location on the Redis cluster based on the hash values at step 540. In certain embodiments, the partitioning is executed so that there is an even number of sub-queues across all available Redis nodes.

In step 550, each of the locations is saved to a record as global data for intra-producer/consumer coordination. The locations, for example, can be saved as keys, which when hashed, provide same hash values as corresponding hashes of sub-queues. Rcprodcons maintains global metadata records created for each virtual queue to allow the consumer applications to automatically and periodically discover all available queue segments so that the consumer can being consumption almost immediately after the segment is saved to the Redis cluster.

In some embodiments, an optional affinity number maybe attached to each "send" command along with the message itself when hashing is performed. If that affinity number is not empty, two records can be guaranteed to be sent to the same sub-queue if they share the same affinity number. Each producer is also capable of generating several sub-queues. The producers may, in some embodiments, append a unique identification (ID) such as its network name to the sub-queue. This can create useful configurations. For example, if M producers each generating N sub-queues affixes a unique ID to each sub-queue, the result would be M×N sub-queues. In other words, there would be more sub-queues than producers. This makes for a "horizontal" partitioning that's particularly useful for large Redis clusters with a small number of producers.

If we have M producers, each generating N sub-queues without affixing a unique ID per producer, then N sub-queues are generated. This is useful for narrowing down the sub-queueing and making the partitioning more "vertical." Vertical partitioning is useful when there's a large producer count (minimizes consumer scan loop steps per full shard scan rotation) on a "narrow" cluster (i.e., low node count). When the producers affix unique IDs, the affinity number guarantees same-shard delivery on the same producer only.

Figure 6:
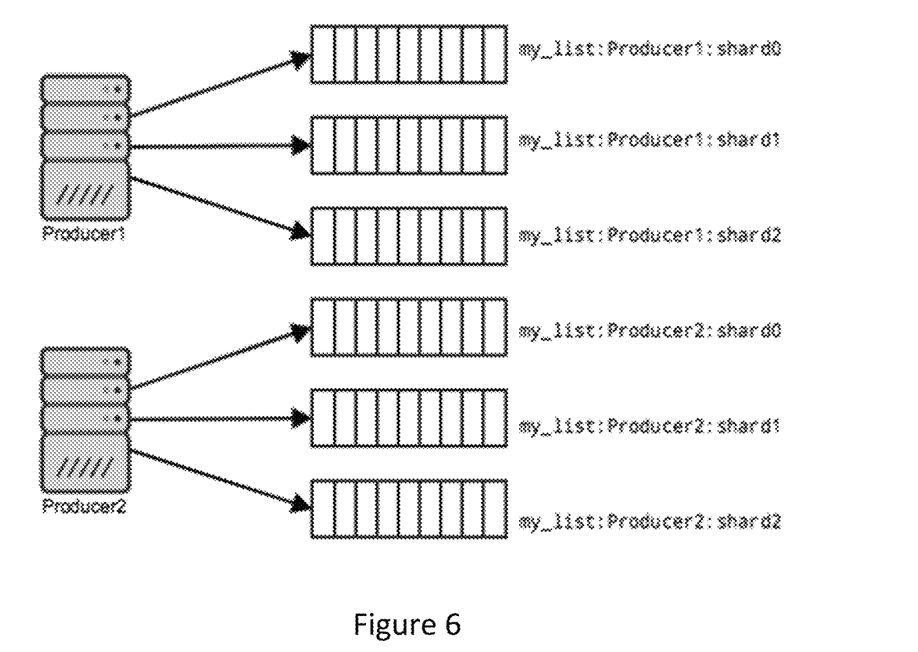
FIG. 6 provides a schematic diagram of a sub-queue generation and delivery of an ID-affixing producer and a resulting list associated with a key stored on a single Redis node.
Figure 7:
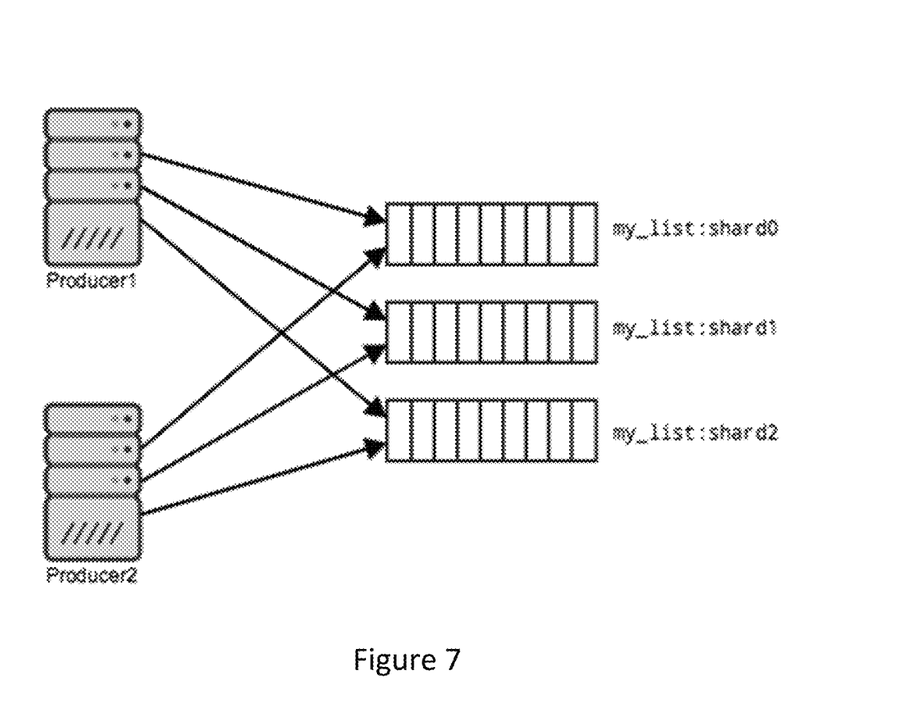
FIG. 7 provides a schematic diagram of a sub-queue generation and delivery of a non-affixing producer and a resulting list associated with a key stored on a single Redis node.

FIGS. 6 and 7 provide schematic diagrams demonstrating the difference between sub-queue generation and delivery of unique ID-affixing and non-affixing producers, respectively. Both diagrams depict two producers that generating three sub-queues each. The only difference is that the producers in FIG. 6 add their own unique IDs to the sub-queue keys while the producers in FIG. 7 do not make this addition.

As shown in FIG. 6, each producer (Producer1 and Producer2) generates three sub-queues (shard0, shard1 and shard2) a piece. In this instance, Producer1 affixes a unique ID (i.e., Producer1) to each sub-queue. The keys that are generated are thus unique from one another because my_list: Producer1:shard0, when hashed, will produce a different key than my_list:Producer2:shard0. Similarly, my_list:Producer1:shard1 and my_list:Producer1:shard2 will produce different keys from my_list:Producer2:shard1 and my_list: Producer2:shard2, respectively, when hashed. Additionally, they'll all result in different keys from one another. The end result of all this is that each of the sub-queues are propagated to a different node. As described above, this creates a horizontal partitioning that's particularly useful for large Redis clusters with a small number of producers.

FIG. 7, on the other hand, depicts Producer1 and Producer2 as generating three sub-queues (shard0, shard1 and shard2) a piece without affixing a unique IDs to each of the sub-queues. The keys that are generated are thus not unique from one another because my_list:shard0 generated by Producer1 will result in the same key as my_list:shard0 from Producer2 when hashed. As such, both of the my_list:shard0 by Producer1 and Producer2 will end up being propagated to the same node. Since evert Redis node acts as a first in first out (FIFO) basket, there is no issue with multiple sub-queues being propagated to the same node as the order in which the sub-queues are propagated and consumed is defined and no confusion would ensue. By not affixing an ID, the partitioning is made more "vertical." Vertical partitioning, as described above, is useful when there's a large number of producers on a narrower cluster with lower node count.

In some embodiments, the producers periodically update a shared metadata set containing information about each producer's sub-queues. This metadata set is used for sub-queue discovery by the consumers. This data is saved to a sorted set. The sorted set maps a score value (i.e., last write timestamp) to each key (i.e., sub-queue name). This sorted set effectively provides a mapping of queues to their last usage timestamp with an acceptable error margin of 1 metadata update cycle interval.

Producers generally will not update a queue to an earlier timestamp than the one already saved, meaning only the latest known timestamp is stored. Consumers are thus able to discover the available sub-queues and scan them for data. Records can be read out-of-order by consumers when partitioned across several sub-queues, and for most use-cases, no issues will arise.

Consumers read the metadata to auto-discover sub-queues as they poll the queues. They also periodically perform metadata cleanup. For example, if a queue time-to-live (TTL) value is configured for a consumer, and a sub-queue was not used for over that TTL value, and the sub-queue is empty (i.e., does not contains any messages), then the record is removed from the metadata set by the consumer. This cleanup is performed to ensure that stale or defunct producers will not adversely affect consumer performance by having their residual/unused sub-queues remain in the scan loop.

Since cleanup is an expensive operation, a different metadata value is updated with the last cleanup time. In one embodiment, the first consumer to decide the metadata wasn't cleaned for too long will perform cleanup and update the timestamp. Many benefits result from such producer/consumer decoupling. Since producers and consumers have defined roles which are not codependent, the two applications can work completely independent of one another. In other words, one never blocks the other. Also, producers are unaware of other producers. That is, producers don't rely on the metadata and don't connect with each other. Consumers similarly may not rely on the metadata and also don't connect to each other. This allows even differently configured producers and consumers to work together without breaking the mechanism. This decoupled manner further allows for producers and consumers to start and stop at any time, without affecting the others or blocking any operation.

Additionally, the fact that each producer updates the metadata as it runs means that even metadata losses (e.g., inadvertent deletion of the Redis instance's data) are quickly mitigated and healed. Also, with the cleanup mechanism being tied to the consumers, the metadata never bloats beyond what's essentially required and is thus kept tidy.

A single Redis instance does not allow for multi-client parallelism. However, since a Redis cluster is used in this instance, the data may be partitioned across several nodes with each node being independent from the others regarding its read/write access. Due to the multiple node usage, rcprodcons effectively offers n-way scaling queue parallelism as the cluster grows, with n being the width of the cluster.

Furthermore, the pipelining mechanism in Redis allows batching multiple commands to a node and sending them at once (receiving an array of results), and rcprodcons uses pipelines to maximize its performance. Thus, when consumers scan the sub-queues to receive data, they will scan multiple sub-queues at once using pipelining. In some embodiments, the exact number of sub-queues is configurable. This means that consumers may retrieve more than one message. In this particular case, the consumer will internally handle multiple messages and will only query Redis once all the messages have been processed.

In some embodiments, producers update the metadata (sub-queue and last-write timestamp) every second while consumers update the queue list every 5 seconds. Cleanup, on the other hand, is performed once 60 seconds have elapsed since the last one. Queue TTL may be adjusted accordingly, but by default, is switched off. The prefetch size (i.e., the maximum number of sub-queues iterated per scan-loop step) is set to 5.

In an exemplary embodiment, sub-queue names are generated with the following template: <virtual_queue_name>[:<unique_producer_id>]:shard<n>. This generation may be deterministic. The virtual_queue_name contains the name assigned to the virtual queue, whose contents are partitioned across multiple sub-queues. The unique_producer_id is optional. If configured, a unique producer ID may be supplied to the producer to differentiate its sub-queues from other producers. In some instances, the unique producer ID may be configured for debugging or monitoring purposes, since it allows for specific producers to be singled out. Lastly, n is a 0-based index that specifies the sub-queues sequence ID. It has no real purpose other than generating incrementing shard IDs so that unique hashes may be created.

In some embodiments, metadata records are prefixed with _RC_PC_QUEUE. This prefix is used to minimize any change of collision with other clients using the Redis cluster. Also, the double underscores may be used to signify an internal private data-structure, generated and modified by internal processes and not intended for external manipulation.

In some embodiments, the global sorted set updated by the producers may be named with the pattern _RC_PC_QUEUE:<virtual_queue_name>:last writes zset, where the virtual_queue_name includes the name assigned to the virtual queue whose contents are partitioned across multiple sub-queues. The sorted set contains a mapping between last-write timestamp (at time of metadata update) and sub-queue name. The timestamp is stored as decimal seconds since epoch (UTC).

Furthermore, the global metadata hash containing other values is named _RC_PC_QUEUE:<virtual_queue_name>:metadata hash, the virtual_queue_name being the same as described above. The hash contains a record for specifying last cleanup time. The timestamp is stored in the hash using the key last_cleanup and is stored as decimal seconds since epoch (UTC).

The user device (i.e., the computing device) described above may be one of a variety of devices including but not limited to a smartphone, a tablet, a laptop and a pair of augmented reality spectacles. Each of these devices embodies some processing capabilities and an ability to connect to a network (e.g., the internet, a LAN, a WAN, etc.). Each device also includes a display element for displaying a variety of information. The combination of these features (display element, processing capabilities and connectivity) on the mobile communications enables a user to perform a variety of essential and useful functions.

The foregoing description is provided to enable a person skilled in the art to practice the various configurations described herein. While the subject technology has been particularly described with reference to the various figures and configurations, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these configurations will be readily apparent to those skilled in the art, and generic principles defined herein may be applied to other configurations. Thus, many changes and modifications may be made to the subject technology, by one having ordinary skill in the art, without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "implementation" does not imply that such implementation is essential to the subject technology or that such implementation applies to all configurations of the subject technology. A disclosure relating to an implementation may apply to all implementations, or one or more implementations. An implementation may provide one or more examples of the disclosure. A phrase such as an "implementation" may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

Furthermore, to the extent that the terms "include," "have," and "the like" are used in the description or the claims, such terms are intended to be inclusive in a manner similar to the term "comprise" as "comprise" is interpreted when employed as a transitional word in a claim.

The word "exemplary" is used herein to mean "serving as an example, instance, or illustration." Any implementation described herein as "exemplary" is not necessarily to be construed as preferred or advantageous over other implementations.

A reference to an element in the singular is not intended to mean "one and only one" unless specifically stated, but rather "one or more." The term "some" refers to one or more. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description.

What is claimed is:

1. A system for distributed queuing of event messages comprising:
    a non-transitory memory storing instructions; and
    one or more hardware processors coupled to the non-transitory memory and configured to read the instructions from the non-transitory memory to cause the system to perform operations comprising:
        receiving a queue of a plurality of event messages;
        generating one or more sub-queues from the received queue;
        affixing to each sub-queue of the one or more sub-queues a unique identification;
        hashing the affixed unique identification of each sub-queue of the one or more sub-queues to generate a unique hash value for each sub-queue of the one or more sub-queues;
        partitioning each sub-queue of the one or more sub-queues to a location on a storage cluster based on the unique hash value for that sub-queue of the one or more sub-queues; and
        saving, for each sub-queue of the set of sub-queues, the location on the storage cluster to which that sub-queue is partitioned.

2. The system of claim 1, wherein the plurality of event messages include information usable to adjudicate permissions of a user associated with the queue.

3. The system of claim 1, wherein the storage cluster is a Redis cluster.

4. The system of claim 3, wherein each sub-queue of the one or more sub-queues is hashed using a CRC16 modulus 16384 hash function.

5. The system of claim 1, wherein the location of each sub-queue of the one or more sub-queues is stored as a key.

6. The system of claim 5, wherein the key, when hashed, provides a same value as a hash of that sub-queue saved in the location associated with the key.

7. The method of claim 1, wherein the saving the location on the storage cluster to which that sub-queue is partitioned includes saving the location to a global metadata set that includes information about each sub-queue of the one or more sub-queues.

8. The method of claim 7, further comprising: mapping a last usage timestamp of each sub-queue of the one or more sub-queues to the location.

9. A method for distributed queuing of event messages comprising:
    receiving a queue of a plurality of event messages;
    generating one or more sub-queues from the received queue;
    affixing to each sub-queue of the one or more sub-queues a unique identification;
    hashing the affixed unique identification of each sub-queue of the one or more sub-queues to generate a unique hash value for each sub-queue of the one or more sub-queues;
    partitioning each sub-queue of the one or more sub-queues to a location on a storage cluster based on the unique hash value for that sub-queue of the one or more sub-queues; and
    saving, for each sub-queue of the set of sub-queues, the location on the storage cluster to which that sub-queue is partitioned.

10. The method of claim 9, wherein the plurality of event messages include information usable to adjudicate permissions of a user associated with the queue.

11. The method of claim 9, wherein the storage cluster is a Redis cluster.

12. The method of claim 11, wherein each sub-queue of the Get of one or more sub-queues is hashed using a CRC16 modulus 16384 hash function.

13. The method of claim 9, wherein the location of each sub-queue of the one or more sub-queues is stored as a key.

14. The method of claim 13, wherein the key, when hashed, provides a same value as a hash of that sub-queue saved in the location associated with the key.

15. A non-transitory machine-readable medium having stored thereon machine-readable instructions executable to cause performance of operations comprising:
- receiving a queue of a plurality of event messages;
- generating one or more sub-queues from the received queue;
- affixing to each sub-queue of the one or more sub-queues a unique identification;
- hashing the affixed unique identification of each sub-queue of the one or more sub-queues to generate a unique hash value for each sub-queue of the one or more sub-queues;
- partitioning each sub-queue of the one or more sub-queues to a location on a storage cluster based on the unique hash value for that sub-queue of the one or more sub-queues; and
- saving, for each sub-queue of the set of sub-queues, the location on the storage cluster to which that sub-queue is partitioned.

16. The non-transitory machine-readable medium of claim 15, wherein the plurality of event messages include information usable to adjudicate permissions of a user associated with the queue.

17. The non-transitory machine-readable medium of claim 15, wherein the storage cluster is a Redis cluster.

18. The non-transitory machine-readable medium of claim 17, wherein each sub-queue of the one or more sub-queues is hashed using a CRC16 modulus 16384 hash function.

19. The non-transitory machine-readable medium of claim 15, wherein the location of each sub-queue of the one or more sub-queues is stored as a key.

20. The non-transitory machine-readable medium of claim 19, wherein the key, when hashed, provides a same value as a hash of that sub-queue saved in the location associated with the key.

* * * * *